US005694694A

United States Patent [19]

Roskam

[11] Patent Number: 5,694,694

[45] **Date of Patent: *Dec. 9, 1997**

[54] RIDELESS SCISSORS WITH AN ADJUSTABLE LOAD TRANSVERSE TO THE PIVOT AXIS ON A PIVOT JOINT AND A HINGED HANDLE

[75] Inventor: Scott H. Roskam, Bigfork, Mont.

[73] Assignee: Maksor, L.L.C., a Limited Liability Company, Bigfork, Mont.

[ * ] Notice: The term of this patent shall not extend beyond the expiration date of Pat. No. 5,440,813.

[21] Appl. No.: 286,301

[22] Filed: Aug. 5, 1994

Related U.S. Application Data

[63] Continuation of Ser. No. 71,781, Jun. 4, 1993, Pat. No. 5,440,813.

[51] Int. Cl.[6] .......... B23B 13/28

[52] U.S. Cl. .......... 30/254; 30/266; 30/267; 30/341; 29/434; 76/106.5

[58] Field of Search .......... 30/254, 260, 266–271, 30/341; 16/273, 275; 29/434, 525.1; 76/106.5; 81/416

[56] References Cited

U.S. PATENT DOCUMENTS

| | | | |
|---|---|---|---|
| 452,260 | 5/1891 | Calahan | 30/266 |
| 826,587 | 7/1906 | Linscott | 30/267 |
| 851,721 | 4/1907 | Witt | 30/268 |
| 923,621 | 6/1909 | Bowes | 30/268 |
| 951,236 | 3/1910 | Crider | 30/266 |
| 2,130,539 | 2/1938 | Feather | 30/268 |
| 2,436,560 | 2/1948 | Feather | 30/266 |
| 2,469,373 | 5/1949 | Feather | 30/268 X |
| 3,316,638 | 5/1967 | Mihalyi | 30/266 X |
| 3,834,022 | 9/1974 | Students | 30/267 X |
| 5,440,813 | 8/1995 | Roskam | 30/254 |

FOREIGN PATENT DOCUMENTS

| | | | |
|---|---|---|---|
| 1303142 | 7/1962 | France | 30/266 |
| 6997 | 4/1889 | United Kingdom | 30/268 |
| 924741 | 5/1963 | United Kingdom | 30/266 |

*Primary Examiner*—Rinaldi I. Rada
*Assistant Examiner*—Clark F. Dexter
*Attorney, Agent, or Firm*—Loeb & Loeb LLP

[57] ABSTRACT

An improved scissors includes a pivot joint having a pivot axis, a first blade member having a first cutting edge and a longitudinal axis, and a second blade member having a second cutting edge. The second blade member is pivotally coupled by the pivot joint to the first blade member with the first cutting edge adjacent and in contact with the second cutting edge. Moreover, the pivot joint is coupled to the first blade member to incline the first blade member relative to the second blade member and the pivot joint, so that the inclination of the first blade member produces a load transverse to the pivot axis of the pivot joint, which corresponds to the direction along the longitudinal axis of the first blade member to produce and determine the tension and friction along the cutting edges. Further, the first blade member may also include a first ride area, and the second blade member may also include a second ride area, so that the first ride area is spaced from and free of contact with the second ride area. Therefore, the scissors may be substantially free of any friction or drag at the "ride" area.

12 Claims, 6 Drawing Sheets

RIDELESS SCISSORS WITH AN ADJUSTABLE LOAD TRANSVERSE TO THE PIVOT AXIS ON A PIVOT JOINT AND A HINGED HANDLE

RELATED APPLICATIONS

This application is a continuation in part of U.S. patent application Ser. No. 08/071,781, filed Jun. 4, 1993, now U.S. Pat. No. 5,440,813.

FIELD OF THE INVENTION

This invention relates to scissors and, in particular embodiments, rideless scissors with an adjustable load transverse to the pivot axis of a pivot joint.

BACKGROUND OF THE INVENTION

Scissors are commonly used to cut materials, such as paper, fabric, hair and the like. Scissors also come in a wide variety of sizes, from small scissors for cutting nails to a metal cutting scissors (e.g., shears).

Typically, scissors are constructed with two separate, slightly bowed blade members being pivotally coupled together by a pivot joint. The blade members are held at three main points: along the opposing cutting edge of each blade member, at the pivot joint, and by the contact between the blade members in back of the pivot joint and before the handle of the scissors. The pivot joint is placed under an axial load directed along the pivot axis of the pivot joint to keep the members together, while the contact in back of the pivot joint acts as a lever with the pivot joint as the fulcrum to produce tension and friction between the cutting edges of the blade members which ensures proper cutting action. There is also a corresponding friction or drag in typical prior art scissors between the blade members where they slide against each other at the point of contact in back of the pivot joint which is known in manufacturing as the "ride" or "half-moon." It is the combination of the pivot joint axial load with the lever contact in the "ride" area which determines the tension and friction along the cutting edges of typical prior art scissors.

Originally, the tension and friction in the scissors was non-adjustable. Typically, a threaded connecting pin with a pivot axis was passed through an oversized non-threaded hole in a movable blade member (with respect to the pin) and screwed into a threaded hole in the stationary blade member (with respect to the pin). The non-threaded pin end was enlarged to form a head or a bearing surface to press the opposing blade members against each other. The enlarged pin head served as the bearing surface for the pivotal movement of the moving member. The connecting pin could be adjusted slightly during manufacture to give slight variations in tension and friction. However, once manufactured, friction and tension in the scissors could not normally be adjusted by the user. Thus, the user was limited to the cutting tension and friction set by the manufacturer.

In non-adjustable scissors, the friction and tension changes over time from wear and loosening of the parts and by the accumulation of dirt and debris. As the parts wear and loosen, desirable tension and friction is reduced, thereby altering the alignment of the scissors. Misalignment causes poor cutting performance and efficiency, shortened tool life, as well as premature loss of edge sharpness. At the same time, undesirable friction or drag between moving parts greatly increases from a build up of dirt and debris between the pin head and the moving blade member, and between the opposing blade members where they make contact at the "ride" area. The result is impaired scissor movement or action due to excessive drag between moving parts.

In attempts to overcome these drawbacks, manufacturers have made the friction and tension in the scissors less sensitive to the effects of wear and the accumulation of dirt and debris. For example, either an anti-friction washer, bushing (usually nonmetallic), ball bearings, or sealed ball bearings have been interposed between the pin head and the moving blade member to reduce wear from friction. Threaded plastic bushings have been pressed into the threaded hole in the stationary blade member to accept the threaded pin and non-rotatively hold it, or the threaded pin is held in place by chemical thread-locking means (such as "Loctite thread locker") or by mechanical thread-locking means (such as deformable plastic strips, patch screws or lock nuts) to prevent wear on the threaded portion of the connecting pin and blade member. While these alternative designs may reduce wear in some parts, they do not eliminate wear along the cutting blades and wear at the "ride". Also, the alternative designs do not prevent or reduce the undesirable effects from the accumulation of dirt and debris between the moving parts and at the "ride" area.

In another alternative, thrust bearings have been interposed between the opposing blade members to reduce friction between the blade members. However, typical thrust bearings are relatively large and, thus, are limited to use on large scissors such as "pinking shears". Moreover, the large bearings cause the members to be widely separated, and thus the blades must exert a lever force on the rear most part of the thrust bearing, which extends into the "ride" area, to create the tension and friction in the cutting blades. This lever force produces wear with undesirable effects similar to that found in other typical prior art scissors. Also, the thrust bearings are especially prone to develop excessive drag through contamination by dirt and debris, because the thrust bearings are unsealed.

Typically, the above-described alternative designs do not provide for alteration of the tension and friction by the user. To allow adjustment of the tension and friction, as well as to address some of the above-described drawbacks, an adjustable tension positive-locking type pivot joint has been used. Typical scissors of this type are constructed like the non-adjustable scissors, except that the connecting pin is provided with either internal or external threads, to which a locking screw or nut is affixed for engaging the opposing blade members together with varying pivot axial loads to adjust the tension and friction. In some scissors, the locking screw or nut is user adjustable, thereby allowing for tailoring of the friction and tension to fit the needs of the individual user.

However, while this type of scissors has adjustable tension and friction, it still suffers from several drawbacks. The operator-adjustable pivot joint may be large and bulky so that it interferes when the scissors are used with another device, such as a guide, a comb or the like. Moreover, frequent adjustment of the adjustable pivot joint may be required to compensate for the locking screw or nut loosening rotationally due to an inadequate locking force (i.e., caused by wear or by poor design) or unintentional contact with the operators hand, or other object, while in use. Also, like in the previously described scissors, continual adjustment of the adjustable pivot joint is required to compensate for loosening blade member tension from wear of sliding parts. Moreover, adjustments of the adjustable pivot joint may be required to compensate for the increased friction or drag between other moving parts from the collection of dirt, debris and corrosion. Typically this accumulation occurs between the pin head and the moving blade member, and between the opposing blade members where they make contact at the "ride".

Thus, even with tension adjustable scissors, the operator is distracted from efficient cutting by the intrusive protrusion of the tension adjusting pivot joint, and the necessity of adjusting the blade member tension to compensate for wear or the loosening of the adjustable pivot joint itself. Tension adjustable scissors give the user greater control over tension and friction, but they do not reduce effects of wear and accumulation of dirt and debris. Therefore, the wear in tension adjustable scissors still results in poor cutting performance and efficiency, shortened tool life, and loss of cutting edge sharpness.

SUMMARY OF THE DISCLOSURE

It is an object of an embodiment of the present invention to provide an improved scissors, which obviates for practical purposes the above-mentioned limitations.

An improved scissors, according to one embodiment of the present invention, includes a pivot joint having a pivot axis, a first blade member having a first cutting edge and a longitudinal axis, and a second blade member having a second cutting edge. The second blade member is pivotally coupled by the pivot joint to the first blade member with the first cutting edge adjacent and in contact with the second cutting edge. Moreover, the pivot joint is coupled to the first blade member to incline the first blade member relative to the second blade member and the pivot joint, so that the inclination of the first blade member produces a load transverse to the pivot axis of the pivot joint, which corresponds to the direction along the longitudinal axis of the first blade member to produce and determine the tension and friction along the cutting edges. Further, the first blade member may also include a first ride area, and the second blade member may also include a second ride area, so that the first ride area is spaced from and free of contact with the second ride area. Therefore, the scissors may be substantially free of any friction or drag at the "ride" area.

In further embodiments of the present invention, the pivot joint in the scissors may be adjustable to increase or decrease the tension and friction between the blade members at the points of contact. A separate adjustment screw or the like is coupled to the first blade member and may be used to increase or decrease the load transverse to the pivot axis and the tension and friction between the blade members by adjusting the tilt or incline of the first blade member with respect to the pivot joint and the second blade member. In other embodiments of the present invention, the pivot joint passes through a pivot bore in each blade member, and the various inclination and tilts provided by the adjustment screw place the pivot joint under various loads transverse to the pivot axis to increase or decrease the tension and friction along the cutting edges.

In preferred embodiments of the present invention, the pivot joint includes a substantially frictionless, sealed bearing assembly, a washer, and a pivot pin having a flanged head and a threaded end. The pivot pin passes through the bearing assembly and the washer and has the threaded end of the pin secured in a threaded pivot bore of the second blade member. The bearing assembly is coupled to the pivot bore of the first blade member, which is sized to allow inclination of the first blade member in the direction along the longitudinal axis of the first blade member. The bearing assembly is held in place between the washer and the flanged head of the pivot pin. Preferably, the bearing assembly has an outer flange. The adjustment screw is positioned to engage the outer flange and tilt or incline the first blade member with respect to the pivot joint and the second blade member.

In a still further embodiment of the present invention, the scissors includes a tension lever with two threaded bores, and the pivot joint includes a substantially frictionless sealed bearing assembly, a washer and a pivot pin having a flanged head and a threaded end. The pivot pin passes through the bearing assembly, the washer, the sized pivot joint hole in the first blade member and the threaded end of the pivot pin is secured in one of the threaded bores in the tension lever and contacts the first blade member. The bearing assembly is held in the pivot joint hole of the second blade member between the head of the pivot pin and the washer. The adjustment member is threaded into the other threaded bore of the tension lever to incline the first blade member with respect to the pivot joint and the second blade member, rather than engaging the outer flange of the bearing assembly.

In still another embodiment of the present invention, a scissors that is designed for use by a particular handed person that is modified to be used by an other-handed person (e.g., a left-handed scissors for use by a right handed person) includes a pivot joint, and two blade members pivotally coupled together. At least one blade member has a hinged handle behind the pivot joint. The hinged handle rotates about a hinge pin to apply a lever force on one side of a fulcrum member to press on the pivot joint on the other side of the fulcrum member, and place the pivot joint in an inclined orientation to create a transverse pivot axial load that forces the cutting members together.

Other features and advantages of the invention will become apparent from the following detailed description, taken in conjunction with the accompanying drawings which illustrate, by way of example, various features of embodiments of the invention.

BRIEF DESCRIPTION OF THE DRAWINGS

A detailed description of embodiments of the invention will be made with reference to the accompanying drawings, wherein like numerals designate corresponding parts in the several figures.

DETAILED DESCRIPTION OF PREFERRED EMBODIMENTS

Figure 1:
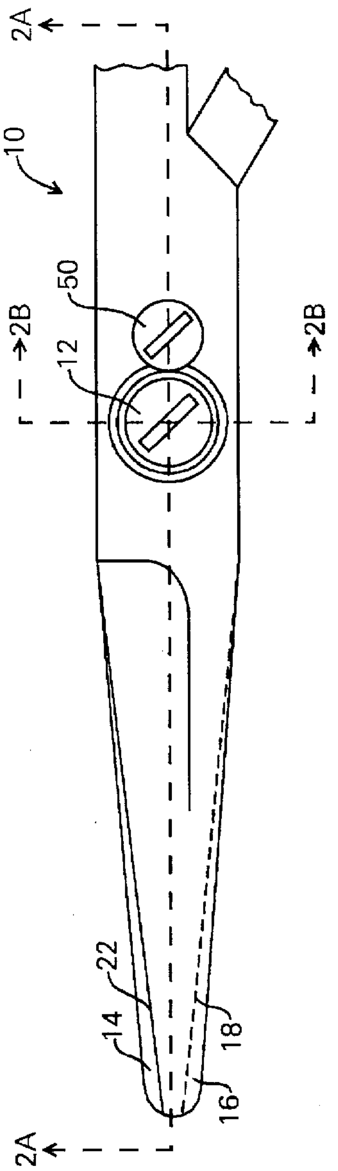
FIG. 1 is a partial perspective view of a scissors in accordance with a first embodiment of the present invention.

As shown in the drawings for purposes of illustration, the invention is embodied in an improved scissors. In preferred embodiments of the present invention, the scissors have a load transverse to the pivot axis and no drag or friction at the "ride" area. Also, the tension and friction may be easily adjusted by the user. However, it will be recognized that further embodiments of the invention include shears, cutters or other instruments which use a scissoring action or a compound shear action with a pivot joint or the like. Moreover, further embodiments of the present invention may be used with scissors having straight blades, curved blades, pinking blades, serrated blades, detachable blades, non-cutting blades, crimping blades or the like.

According to the preferred embodiments of the present invention, the scissors have two blade members pivotally coupled together by a pivot joint. Each blade member contacts the pivot joint and the other blade member along a cutting edge. There may be substantially no contact in the "ride" area (e.g., the scissors are rideless), so that all friction and tension, and therefore wear, in the "ride" area may be eliminated. It is important to note that scissors made in accordance with the preferred embodiments of the invention do not need tension and friction produced in the "ride" area to function, since one member is inclined relative to the pivot joint and the other member to produce a load transverse to the pivot axis which force the cutting edges of the members together with the proper tension and friction. However, typical prior art scissors require tension and friction in the "ride" area to work properly. Also, typical prior art scissors only have a pivot axial load (directed along the pivot axis) at the pivot joint.

Moreover, the scissors, in accordance with the preferred embodiments, may use a sealed ball bearing assembly to further reduce friction between the moving parts in the pivot joint. Thus, friction and wear in the pivot joint is minimized (i.e., only minimal friction is generated between moving parts in the ball bearing assembly).

Minimizing friction in the moving parts and eliminating friction in the "ride" area allows the scissors to maintain a more constant state of adjustment with regard to cutting blade tension settings and blade member alignment. Therefore, wear and loosening will only occur along the cutting edges of each blade member, and only to a very minor degree within the sealed, lubricated environment of the sealed bearing assembly. Thus, the tension and friction set by the manufacturer or user is substantially unaffected by the wear and loosening of the parts, which is commonly encountered in typical prior art scissors.

Also, the presence of dirt and debris have less of an effect on the scissors in accordance with embodiments of the present invention. For instance, because there is substantially no contact between the blade members in the "ride" area, this area is easier to clean. Also, dirt and debris have minimal effect on the operation of the sealed ball bearing, since it is sealed and all moving parts are contained within the sealed environment.

In still further embodiments, the tension and friction of the scissors may be user adjustable. The operator can use an adjustment screw, detent, bolt, spring, shim, spacer, tab or the like (i.e., a relatively small and unobtrusive adjustment member), to increase or decrease the load transverse to the pivot axis which adjusts the tension and friction in the members and the cutting edge blades. In preferred embodiments, the adjustment member may be part of the pivot joint.

Figure 2A:
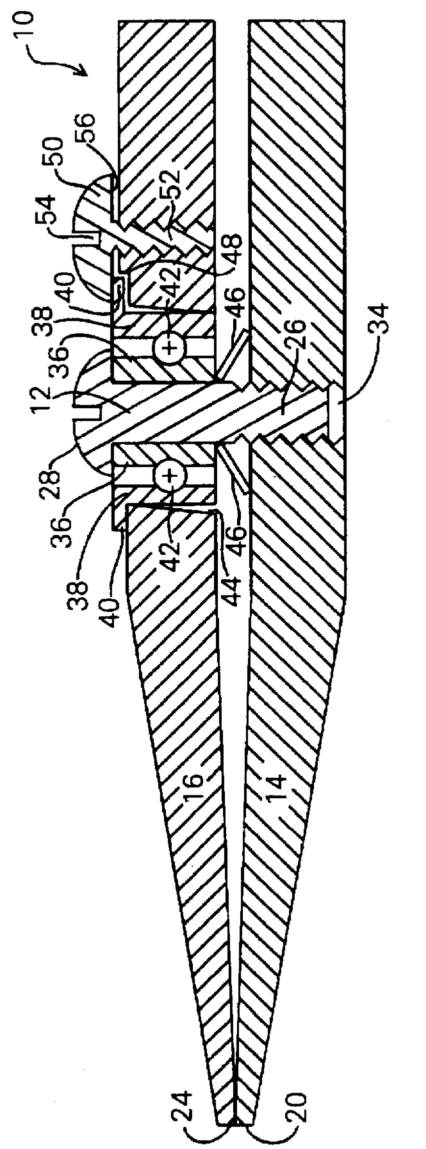
FIG. 2A is a partial cross-sectional view of the scissors shown of FIG. 1 as viewed along the line 2A—2A.
Figure 2B:
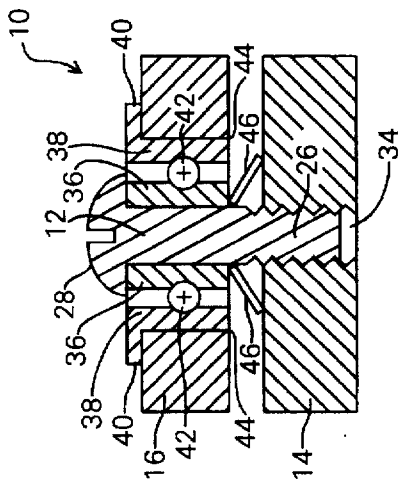
FIG. 2B is a partial cross-sectional view of the scissors shown of FIG. 1 as viewed along the line 2B—2B.
Figure 2C:
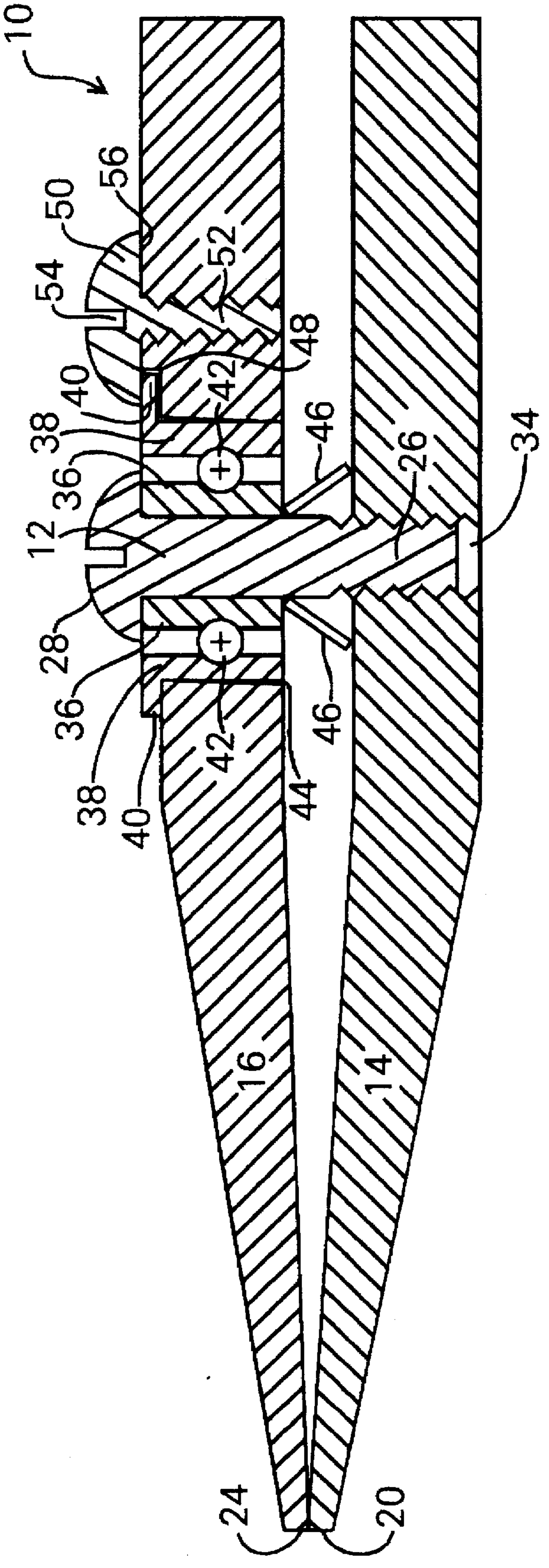
FIG. 2C is another partial cross-sectional view of the scissors shown in FIG. 1 as viewed along the line 2A—2A.
Figure 3:
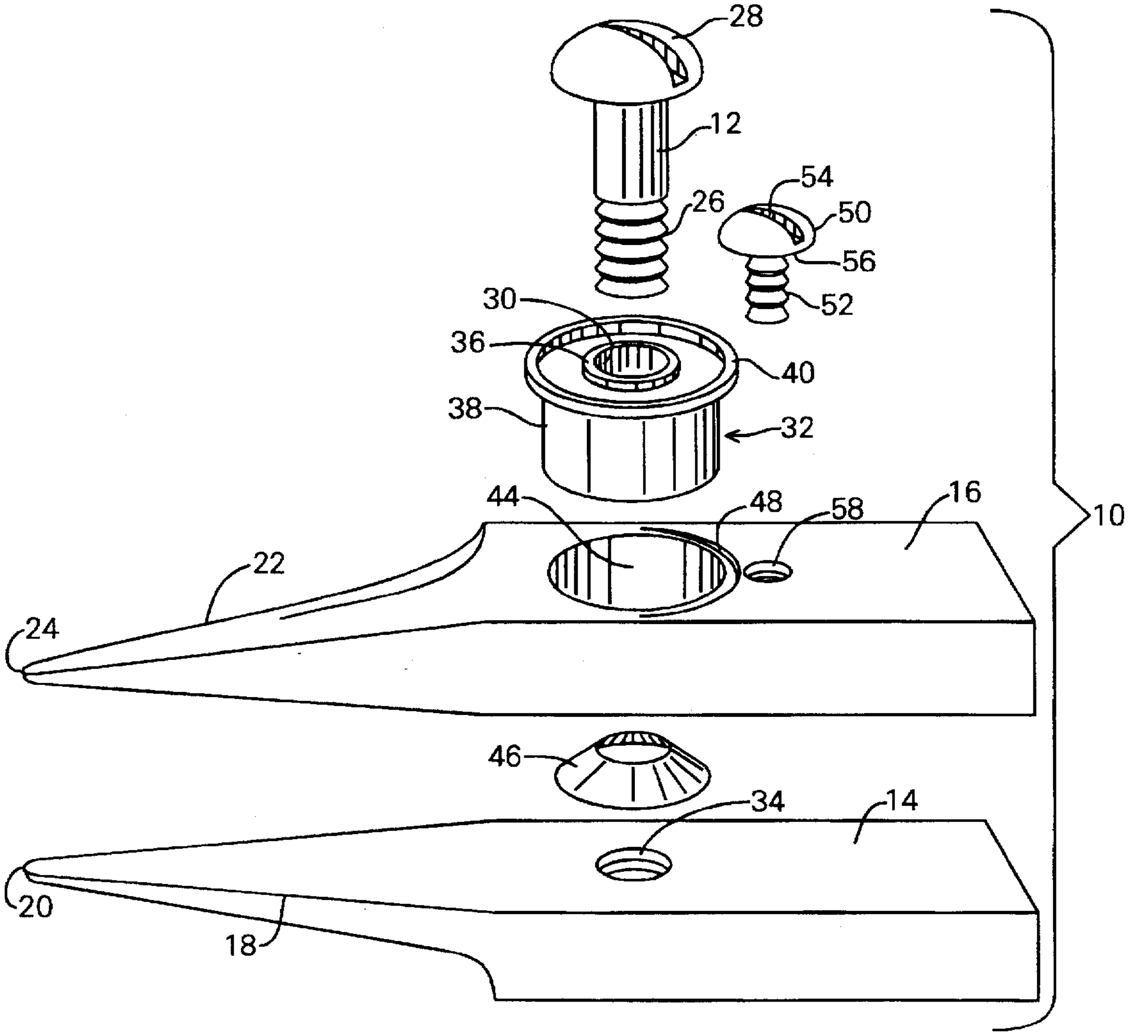
FIG. 3 is an exploded view of the scissors shown in FIG. 1.
Figure 5:
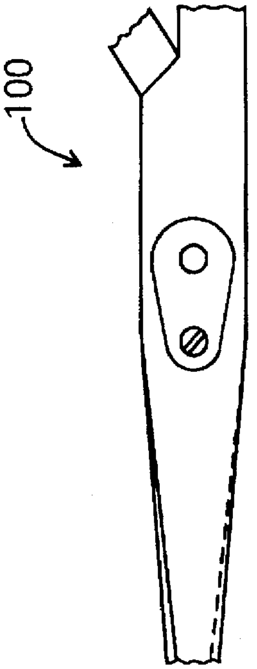
FIG. 5 is a partial bottom perspective view of the scissors shown in FIG. 4.
Figure 4:
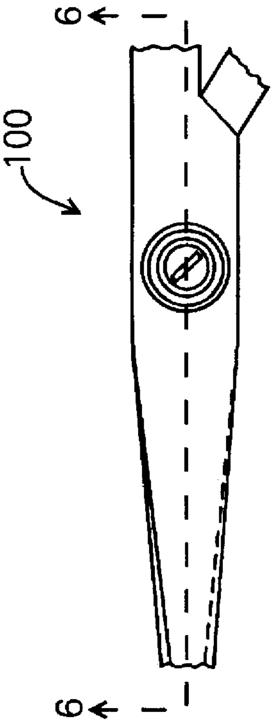
FIG. 4 is a partial top perspective view of a scissors in accordance with a second embodiment of the present invention.

A first improved scissors 10 in accordance with a preferred embodiment of the present invention is shown in FIGS. 1–3. The scissors 10 include a connecting pin 12 having a pivot axis, a stationary blade member 14 (i.e., with respect to pin 12) and a moving blade member 16 (i.e., with respect to the pin 12). The stationary blade member 14 has a cutting edge 18 and a tip 20, and the moving blade member 16 has a cutting edge 22 and a tip 24. The connecting pin 12 has a threaded end 26 at one end and a flanged head 28 at the other end.

As shown in FIG. 2A, stationary blade member 14 and moving blade member 16 are pivotally coupled together by a pivot joint which includes the connecting pin 12. The connecting pin 12 passes through the center opening 30 of a sealed ball bearing assembly 32 and is screwed into a threaded connecting pin hole 34 in the stationary member 14 by threaded end 26. The connecting pin 12 may be threaded directly into the stationary blade member 14, or the threaded connecting pin hole 34 may be provided with deformable plastic strips or patch inserts to produce a positive locking force to secure the connecting pin 12 non-rotatively to the stationary blade member 14. Other connecting pin arrangements may be used in alternative embodiments, including nut and bolt arrangements, attached stud, rivet arrangement, pin and cotter pin arrangements or the like.

In the illustrated embodiment, the ball bearing assembly 32 is of a prelubricated, sealed stainless steel arrangement. The ball bearing assembly 32 includes an inner race 36, an outer race 38, a flange 40, and ball bearings 42. The sealed ball bearing assembly 32 is seated within a ball bearing assembly hole (i.e., a pivot joint hole) 44 in the moving member 16. The ball bearing assembly hole 44 is oversized and inclined in a direction along the longitudinal axis of the moving blade member 16 (as shown in FIG. 2A) to allow clearance for outer race 38 of the ball bearing assembly 32 to tilt or incline with respect to the longitudinal axis (parallel to line 2A—2A in FIG. 1) of the moving blade member 16. For example, the ball bearing assembly hole 44 is oversized to form an oval shape with the longest diameter of the oval being along the longitudinal axis of the moving blade member 16. This allows the bearing assembly 32 to be inclined or tilted back along the longitudinal axis of the moving member 16 into a semicircular recess 48. In alternative embodiments, the ball bearing assembly hole 44 may be formed in other shapes, such as rectangles or the like. In preferred embodiments, the ball bearing assembly hole 44 is not oversized in the direction perpendicular to the longitudinal axis of the moving blade member 16 (i.e., parallel to line 2B—2B in FIG. 1), and is as shown in FIG. 2B. However, alternative embodiments may utilize a hole 44 that is somewhat oversized in the direction parallel to line 2B—2B, but oversizing the hole 44 in this direction tends to make the scissors less stable and allows the blade members to wobble relative to each other.

A conical spring washer 46 is interposed between the stationary blade member 14 and the ball bearing assembly 32 to provide variable clearance between the ball bearing assembly 32 and the stationary blade member 14. The inner race 36 of the ball bearing assembly 32 is the only part of ball bearing assembly 32 to contact the top of conical spring washer 46. In preferred embodiments, the conical spring washer 46 is made of spring steel and may be a Belleville washer which deflects under pressure. However, non-metallic washers, laminated washers, spacers, bushings, shim washers or the like may be used. Also, proper spacing may be made integral with the blade member or may be made integral with the bearing assembly without using a washer. Moreover, the washer may extend beyond the rear of the pivot joint into the "ride" area, this extension may increase friction. The ball bearing assembly 32 is held and secured in the ball bearing assembly hole 44 between the conical spring washer 46 and the flanged head 28 of the connecting pin 12. In alternative embodiments, the conical spring washer 46 may be omitted, and the ball bearing assembly is retained in place along the connecting pin 12 by another method, such as friction, a press fit or the like, such that the connecting pin 12 cannot back-out or slide within the ball bearing assembly hole under normal use conditions.

As shown in FIGS. 1–3, the moving blade member 16 has a semicircular recess 48 which defines a half-circle around the rear portion (i.e., the portion farthest from the tip 24) of the ball bearing assembly hole 44. The semicircular recess 48 is counterbored on an axis that is offset (i.e., approximately 5°, although other oblique angles may be used) to the rear of an axis which is perpendicular to the longitudinal axis of moving blade member 16.

FIG. 2A shows that the flange 40 on the outer race 38 of the ball bearing assembly 32 is positioned within the semicircular recess 48. A tension screw 50 has threads 52, a slot 54, and an engagement surface 56. The engagement surface 56 contacts the flange 40 of the ball bearing assembly 32 to control the tilt or incline of one blade member relative to the other and the pivot joint. The tension screw 50 is screwed into a threaded tension screw hole 58 to increase or decrease the tension and friction, and thus produce a corresponding load transverse to the pivot axis in the connecting pin 12 and the ball bearing assembly 32 portions of the pivot joint. The tension screw 50 may be screwed directly into the tension screw hole 58 or it may be provided with a deformable plastic strip or patch insert on the threads 52 to produce a positive locking effect, which is still easily adjustable by the operator. To further facilitate tension and friction adjustment, the slot 54 in tension screw 50 is made wide enough to use a coin, screwdriver, or nail file to turn the tension screw 50.

In alternative embodiments, the tension screw 50 may be replaced with a threaded post and a threaded finger nut that contacts and engages the flange 40 of the ball bearing assembly 32. The threaded post is threaded into the tension screw hole 58. However, in alternative embodiment, the threaded post may be held in the tension screw hole by friction, press fit, welding or the like, or the threaded post may be spot welded to top of the moving blade member 16. Once the threaded post is coupled to the moving blade member 16, the threaded finger nut is threaded on to the threaded post, and adjusted so that the bottom of the finger nut contacts and engages the flange 40 of the ball bearing assembly 32 to adjust the tension and friction in the blade members. The threaded finger nut provides a tension adjusting advantage over the tension screw 50, since it can be adjusted by the hand of the user directly, rather than requiring an additional tool, such as a screw driver or the like.

In the preferred embodiments, corrosion resistance for the entire scissors is achieved by making all metallic components of stainless steel. However, other materials such as plastics, ferrous alloys, non-ferrous alloys, ceramics or the like may be used, the choice being partially dependent on the material to be cut and the environment in which the scissors 10 will be used. The ball bearing assembly 32 is preferably selected from the group of ball bearings known as stainless steel, sealed ball bearings. For example, the sealed ball bearing part no. B2-14-S available from Winfred M. Berg, Inc., East Rockaway, N.Y. may be used. These assemblies provide permanent lubrication of all actively moving parts in the pivot area of the scissors 10, and are thus an effective barrier to dirt, debris, and corrosion. However, other bearing assemblies may be used which provide smooth operation, resistance to dirt and debris, and resistance to wear and corrosion.

The operation of the above-described preferred embodiment is best illustrated in FIG. 2A. The engagement surface 56 of the tension screw 50 presses against the flange 40 of the ball bearing assembly 32 with increasing pressure as the tension screw 50 is screwed into the tension screw hole 58. As the pressure on the flange 40 increases, the moving blade member 16 is tilted or inclined (i.e., towards the tips 20 and 24 to increase tension and friction) in relation to the outer race 38 of the ball bearing assembly 32. For example, FIG. 2(C) illustrates the increased inclination or tilt caused when the tension screw 50 places increasing pressure on the flange 40 of the ball bearing assembly 32. The increased inclination of the moving blade 16 increases the load transverse to the pivot axis on the pivot joint parts, such as the connecting pin 12 and the ball bearing assembly 32. The load transverse to the pivot axis is generated by a moment on the pivot axis of the joint in a plane passing through the pivot axis and a point of contact between the cutting edge 18 and cutting edge 22 or the tip 20 and tip 24. This load transverse to the pivot axis replaces the lever contact in the "ride" area which is required in typical prior art scissors. Therefore, preferred embodiments of the scissors 10 may be rideless.

This load transverse to the pivot axis causes the moving blade member 16 to be pressed against the stationary blade member 14 at their mutual point of contact along cutting edges 18 and 22. In FIGS. 1 and 2A, this point of contact is shown as being the tips 20 and 24, since the scissors 10 are shown in the closed position. Tightening or loosening of the tension screw 50 correspondingly places a greater or lesser tilt or incline (see FIGS. 2A and 2C) and load transverse to the pivot axis on the ball bearing assembly 32 and connecting pin 12, which then correspondingly increases or decreases the tension and friction between the cutting edges 18 and 22.

Clearance between the moving blade member 16 and the stationary blade member 14 is decreased or increased by correspondingly tightening or loosening the connecting pin 12, causing the ball bearing assembly 32, through the inner race 36, to press on and deform the conical spring washer 46. This pressure through the inner race 36 may also aid in holding the connecting pin 12 in a non-rotational position with respect to stationary blade member 14.

As the blade members 14 and 16 of the scissors 10 pivot back and forth relative to each other, the lack of friction and drag in the "ride" area (i.e., the scissors are rideless) and the smooth, lubricated movement in the ball bearing assembly 32 in the pivot area provides ease of operation in the scissor action due to the exceptionally low friction between these moving parts. Also, the friction and tension tend to be less susceptible to change resulting from wear, dirt and debris. Thus, the scissors 10 substantially eliminate the wear between scissor parts commonly found in typical prior art scissors, which have drag and friction at the "ride" area and do not use an anti-friction bearing interposed between frictionally contacting parts. Therefore, the scissors 10 provide optimum edge sharpness and long-lasting edge durability, due to excellent blade member stability and constancy of adjustment and alignment.

Moreover, care and maintenance of the scissors 10 is easier than in typical prior art scissors, since the permanently lubricated sealed stainless steel ball bearing assembly, as used in the preferred embodiments, is resistant to wear, corrosion, and the effects of dirt. The lack of contact and friction at the "ride" area also makes this area easier to clean. The use of a tension screw 50 provides a low profile to the adjustment member and, thus, avoids the problem of having large and bulky parts to adjust the tension in the scissors 10.

A second improved scissors 100 in accordance with preferred embodiments of the present invention is shown in FIGS. 4–7. Structural differences between the scissors 100 and the embodiment described above are shown in FIGS. 5 and 6. The connecting pin 112 passes through the center of the ball bearing assembly 132 and the conical washer 146o However, the connecting pin 112 also passes through a non-threaded connecting pin hole 134 in the stationary blade member 114. The connecting pin 112 is screwed into a threaded tension lever connecting hole 162 in a tension lever 160. A tension lever screw 164 is screwed into a tension lever screw hole 166 in one end of tension lever 160. The tension lever screw 164 has a tip 168 which contacts and presses against the stationary blade member 114 at its point of contact in a tension bore 170.

Other differences are that the ball bearing assembly 132 need not tilt or incline and is seated with a press fit in a ball bearing assembly hole 144. Also, the connecting pin hole (i.e., a pivot joint hole) 134 is oversized in a direction along the longitudinal axis to allow clearance for the connecting pin 112 to tilt or incline with respect to the longitudinal axis of the moving blade member 116 and produce a load transverse to the pivot axis on the connecting pin 112. Moreover, in this embodiment, the tension screw 50 with its related parts and the semicircular recess 48 are eliminated. For example, the connecting pin hole 134 is oversized to form an oval shape with the oval being along the longitudinal axis of the moving blade member 118. This allows the connecting pin 112 to be inclined or tilted back along the longitudinal axis of the stationary member 114.

Figure 6:
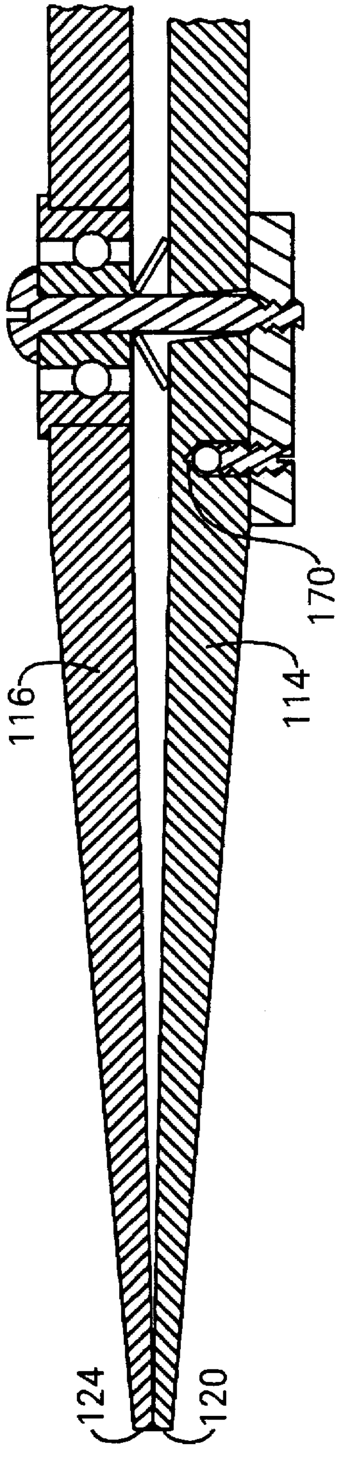
FIG. 6 is a partial cross-sectional view of the scissors shown in FIG. 4 as viewed along the line 6—6.
Figure 7:
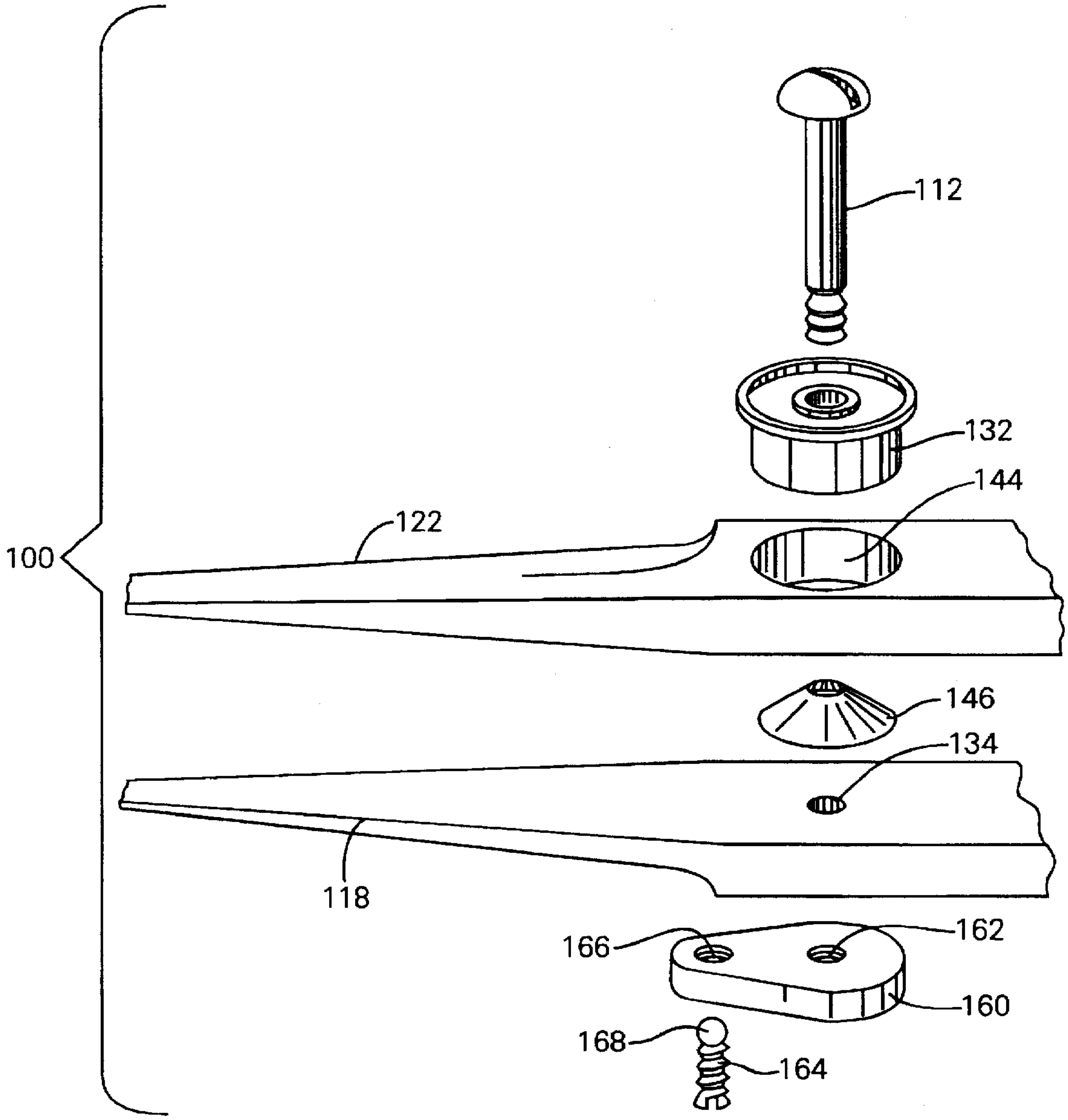
FIG. 7 is an exploded view of the scissors shown in FIG. 4.

The operation of the above-described second embodiment is best illustrated in FIG. 6. The tip 168 presses against the stationary blade member 114 at the tension bore 170 with increasing pressure as the tension lever screw 164 is screwed into the tension lever screw hole 166. As the pressure on the stationary blade member 114 increases, the stationary blade member 114 is tilted or inclined in relation to the connecting pin 112, the ball bearing assembly 132, and the moving blade member 116. The inclination of the stationary blade member 114 produces a load transverse to the pivot axis to maintain the tension and friction along the cutting edges. The stationary blade member 114 is pressed against the moving blade member 116 at their mutual point of contact along cutting edges 118 and 122 as the scissors 100 open or close, or at the tips 120 and 124 when the scissors are in the closed position, as shown in FIG. 6.

Figure 8:
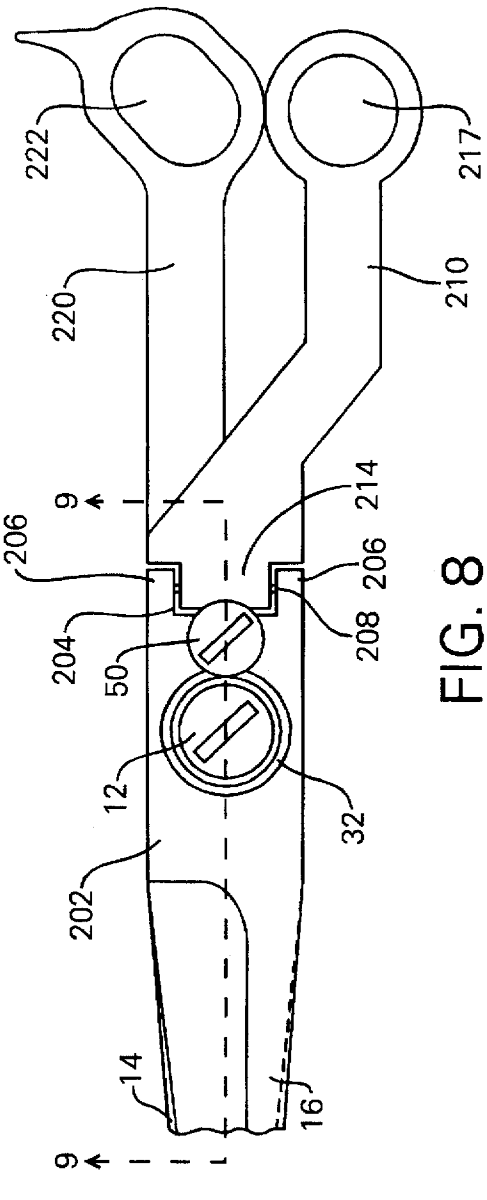
FIG. 8 is a partial top perspective view of a scissors in accordance with a third embodiment of the present invention.
Figure 10:
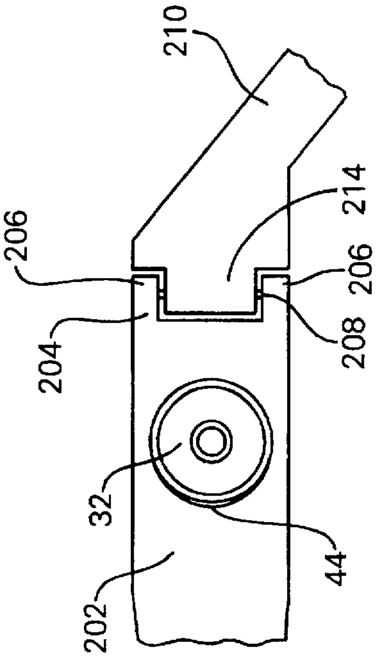
FIG. 10 is a partial bottom perspective view of the scissors handle shown in FIG. 8.
Figure 9:
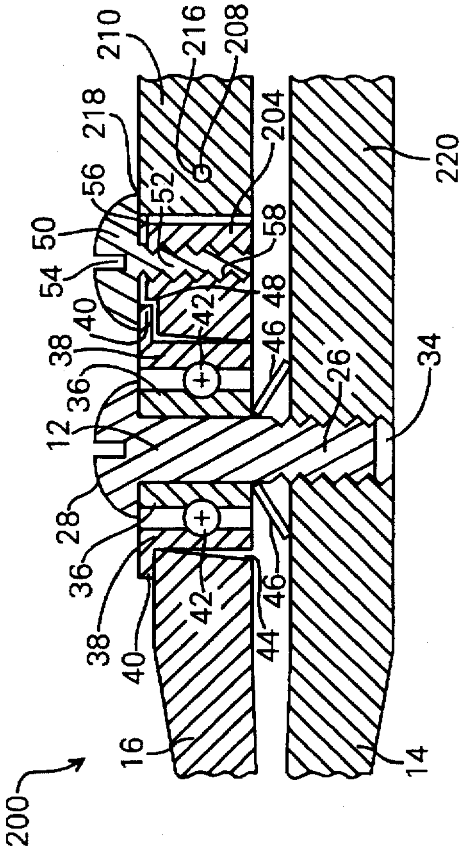
FIG. 9 is a partial cross-sectional view of the scissors shown in FIG. 8 as viewed along the line 9—9.

A third improved scissors 200 in accordance with preferred embodiments of the present invention is shown in FIGS. 8–10. Structural differences between the scissors 200 and the first embodiment described above are shown in FIGS. 8–10, and the similar structural elements are numbered with like numbers corresponding to the numbers in the first embodiment. The scissors 200 has a thumb handle and a finger handle interchanged so that the scissors 200 would be designed for use by a particular handed person (e.g., a left-handed person), if no other modifications to the embodiment of FIGS. 1–3 are made. However, the scissors 200 in FIGS. 8–10 is then further modified for use by an other-handed person (e.g., a left-handed scissors for use by a right handed person).

As shown in FIGS. 8 and 9, the moving blade member 16 of the scissors 200, contains the ball bearing assembly 32 and the connecting pin 12 in the bearing assembly hole 44. The moving blade member 16 also includes the tension screw 50 that is threaded into the tension hole 58 to contact and engage the flange 40 of the ball bearing assembly 32 to adjust the tension and friction between the blade members 14 and 16. The stationary blade member 14 contains the threaded end 26 of the connecting pin 12 in the threaded connecting pin hole 34. However, since the thumb handle is now connected to the moving member 16 the pivot joint would be orientated to face in a different direction relative to the palm of the users hand, and would be angled differently than in the previous embodiments. Thus, the scissors 200 illustrated in FIGS. 8 and 9 would be suitable for use by left-handed persons. Using a left-handed scissors in a right-hand has the benefit of placing the moving blade member away from an area or other fingers during the cutting operation. Embodiments of the scissors 200 can be used effectively in all cutting situations for more control (i.e., the moving blade member faces the palm of the user's hand). For example, when cutting hair, the user can support the stationary blade member 14 on the fingers holding the hair rather than the moving blade member 16 to thereby increase stability and reduce the possibility of injury. Thus, the scissors 200 can be used for more controlled cutting with less risk of injury.

FIG. 10, illustates a bottom perspective of the embodiment of FIGS. 8 and 9. It shows that the bearing assembly hole 44 is oversized in a direction along the longitudinal axis of the blade member to permit the ball bearing assembly 32 to incline within the bearing assembly hole 44.

As shown in FIGS. 8–10, the moving blade member 16 includes a pivot portion 202 that holds the pivot joint assemblies described above. One end of the pivot portion 202 is coupled to the cutting edge of the moving blade member 16, while the other end is adapted to be connected to a handle hinge portion 204. The handle hinge portion 204 is illustrated as having a substantially block "C" shaped notch for receiving and hingeably securing a handle between a pair of hinge support members 206. The notch of the handle hinge portion 204 extends into the pivot portion 202 of the moving blade member 16, so that a part of the engagement surface 56 of the tension screw 50 overhangs the notch as shown in FIGS. 8 and 9. In alternative embodiments, a plurality of notches and hinge support members may be used, or different shape notches and hinge members may be used to secure a handle to the scissors 200. Each of the hinge support members 206 has a hinge pin hole (not shown) provided for securing a hinge pin 208. Alternative embodiments, may use hinge devices other than a hinge pin, such as rivets, nuts and bolts or the like.

The scissors 200 also includes a thumb handle 210 that has a thumb hole portion 212 and a hinge connecting portion 214. The hinge connecting portion 214 is shaped to fit within the handle hinge portion 204 of the moving blade member 16, and includes a hinge pin hole 216 for rotatably receiving the hinge pin 208. The thumb handle 210 is rotatably secured (e.g., hinged) by the hinge connecting portion 214 to the handle hinge portion 204 of the moving member 16 by the hinge pin 208 passing through the hinge pin hole 216, and the ends of the hinge pin 208 are secured in the hinge pin holes of the hinge support members 206.

The hinge connecting portion 214 has a lever force producing end 218 for engaging the engagement surface 56 of the tension screw 50, when the thumb handle 210 is secured to the hinge portion of the moving blade member 16. The lever force producing end 218 is formed on the hinge connecting portion 214 on the side of the hinge pin 208 opposite the side of the hinge connecting portion 214 that is connected to the thumb hole 212 of the thumb handle portion 210. Thus, as the thumb handle 210 is rotated about the hinge pin 208, by movement of a thumb acting on the thumb hole 212, the hinge pin 208 acts as a fulcrum to apply a lever force on the engagement surface 56 of the tension screw 50. As a lever force is applied to the engagement surface 56 of the tension screw 50, by the lever producing end 218 of the hinge connecting portion 214, the threaded portion 52 of the tension screw acts as another fulcrum to apply a lever force to the flange 40 of the ball bearing assembly 32 with a part of the engagement surface 56 of the tension screw 50 on the opposite side of the threads 52, as shown in FIGS. 8 and 9. This lever force on the flange 40 of the ball bearing assembly 32, alters the inclination of the ball bearing assembly 32 in the bearing assembly hole 44, which changes the load transverse to the pivot axis of the pivot joint and increases or decreases the tension and friction along the cutting edges of the blade members.

The scissors 200 also includes a finger handle 220 that has a finger hole stationary finger handle 220 is coupled to the stationary blade member 14. In operation, the scissors 200 is grasped by the user, with the thumb placed through the thumb hole 212 of the thumb handle 210, and a finger placed through the finger hole 222 of the of the finger handle 220. To use the scissors 200, the user moves the thumb back and forth to produce a scissoring action between the cutting edge of the blade members. However, since the scissors 200 is primarily designed as left-handed scissors for use by a right-handed person, the thumb tends to engage the moving blade member 16 in a manner that tends to pull the cutting edges of the blade members away from each other. This tends to decrease friction, and increase wear and instability in the scissors. With the inclusion of the hinged thumb handle 210 of the scissors 200, the thumb rotates the thumb handle 210 about the hinge pin 208. As the thumb handle 210 rotates about the hinge pin 208, it applies a lever force to a part of the engagement surface 56 of the tension screw 50, which forces an opposite part of the engagement surface 56 to contact and engage the flange 40 of the ball bearing assembly 32. The engagement of the flange 40 further inclines the ball bearing assembly 32 in the bearing assembly hole 44, which in turn increases the load transverse to the pivot axis on the scissors 200. The increased load transverse to the pivot axis forces the cutting edges of the blade members together and further increase the tension and friction on the cutting edges. Thus, the increased load transverse to the pivot axis substantially offsets or reduces the effect of the pull away motion (or tension and friction reducing effects) of the thumb in the thumb hole 212 of the thumb handle 210. Thus, proper cutting tension and friction are maintained.

In preferred embodiments, the tension screw 50 of the scissors 200 is formed from a flexible material, such as nylon, plastic, composites of metal and plastic, or the like, to allow the tension screw 50 to more easily flex while applying the lever force to the ball bearing assembly 32. In alternative embodiments, a flexible threaded post made of flexible material, such as nylon, plastic or the like, is used with a metal threaded finger nut in place of the tension screw 50, in a manner as described above in the embodiment of FIGS. 1–3. The harder metal finger nut would resist deformation under the lever force and the flexible threaded post would provide the desired level of flexibility.

In alternative embodiments, the use of a right-handed scissors that is formed like the scissors 200 for use by a left-handed person can be effected in a similar manner and would have the same attributes as the scissors 200 described above. In other embodiments, the hinged handle arrangement, may be adapted for use on scissors having symmetrical handles, rather than the asymmetrical handles shown in FIGS. 8–10.

In further embodiments, the hinged handle arrangement described above, can be applied to traditional scissors that use a pivot axial load to force the blade members together. In this embodiment the hinged handle applies a lever force to the pivot joint either directly or through a separate tension adjusting member to increase the load transverse to the pivot axis that increases tension and friction along the cutting edges of the blade members. The increased pivot axial load forces the cutting blades together and substantially offsets or reduces the effects of the motion of the thumb in the thumb hole of the thumb handle.

In the illustrated embodiments, the scissors are shown with a tension adjustment screw or member. However, in further embodiments the adjustment screw is omitted and the connecting pin is used alone, without an adjustment screw or member, to adjust the tension and friction in the scissors. For instance, the ball bearing assembly hole 44 may not be oversized as described above. Rather, the ball bearing assembly hole 44 may precisely fit the ball bearing assembly 32. However, the ball bearing assembly hole 44 would be tilted or inclined with respect to the longitudinal axis of the moving member 16. This inclination would produce a load transverse to the pivot axis that determines the tension and friction along the cutting edges.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A scissors, comprising:

a pivot joint having a pivot axis and a diameter;

a first blade member having a first cutting edge and a longitudinal axis, the first blade member further including a first coupling portion having a pivot joint bore defined therein, the pivot joint bore being oversized with respect to the diameter of the pivot joint in a direction along the longitudinal axis of the first blade member;

a securing member coupled to the first blade member and rigidly secured against the pivot joint; and a second blade member having a second cutting edge and a second pivot joint coupling portion, the second pivot joint coupling portion of the second blade member being coupled to the pivot joint such that the second pivot joint coupling portion of the second blade member is fixed relative to the pivot axis of the pivot joint, the second blade member also being pivotally coupled by the pivot joint to the first blade member with the first cutting edge adjacent to the second cutting edge, the pivot joint being coupled to the first blade member through the pivot joint bore in the the first pivot joint coupling portion of the first blade member, the pivot joint being inclined within the oversized pivot joint bore and rigidly secured therein by the securing member in an inclined orientation relative to the first blade member in the direction along the longitudinal axis of the first blade member such that the first pivot joint coupling portion of the first blade member is oblique to the pivot axis of the pivot joint and the first blade member is inclined relative to the second blade member and the pivot joint, wherein the rigid secured inclined orientation of the pivot joint generates a moment on the pivot axis of the pivot joint in a plane passing through the pivot axis and a point of contract between the first and second cutting edges, the moment forcing the first cutting edge into contact with the second cutting edge to produce tension and friction between the first and second cutting edges.

2. The scissors according to claim 1, wherein the first blade member further includes a first ride area on a side of the pivot joint opposite the first curling edge of the first blade member, and wherein the second blade member further includes a second ride aim on a side of the pivot joint opposite the second curing edge of the second blade member, wherein when the first pivot joint coupling portion of the first blade member is pivotally coupled to the second pivot joint coupling portion of the second blade member by the pivot joint the first ride area and the second ride area are on the same side of the pivot joint, and wherein the secured inclined orientation of the pivot joint with respect to the first blade member prevents the first ride area from contacting with the second ride area such that the first ride area is spaced apart from and free of contact with the second ride area.

3. The scissor according to claim 1, wherein the pivot joint bore is inclined at an angle relative to an axis perpendicular to the longitudinal axis of the first blade member and along the longitudinal axis of the first blade member to facilitate inclining the pivot joint in the inclined orientation.

4. A scissors, comprising:

a pivot joint having a pivot axis and a diameter;

a first blade member having a first cutting edge and a longitudinal axis, the first blade member further having a pivot joint defined therein, the pivot joint hole being oversized with respect to the diameter of the pivot joint in a direction along the longitudinal axis of the first blade member, and the first blade member also having an inclined recess formed adjacent the pivot joint hole such that a bottom of the inclined recess is inclined to the rear of an axis that is perpendicular to the longitudinal axis of the first blade member, and wherein an interior of the inclined recess contains a portion of the pivot joint;

a securing member coupled to the first blade member and securing the pivot joint in said pivot joint hole; and a second blade member having a second cutting edge, the second blade member being pivotally coupled by the pivot joint to the first blade member with the first cutting edge adjacent to the second cutting edge, the pivot joint being coupled to the first blade member through the pivot joint hole in the first blade member, the pivot joint being secured in an inclined orientation in the inclined recess adjacent the pivot joint hole by the securing member contacting the portion of the pivot joint to incline and rigidly secure the pivot joint into the inclined recess of the first blade member in the direction along the longitudinal axis of the first blade member such that the first blade member is oblique to the pivot axis of the pivot joint and the first blade member is inclined relative to the second blade member and the pivot joint, wherein the inclined orientation maintained by the securing member generates a moment on the pivot axis of the pivot joint in a plane passing through the pivot axis and a point of contact between the first and second cutting edges, the moment forcing the first cutting edge into contact with the second cutting edge to produce tension and friction between the first and the second cutting edges.

5. The scissors according to claim 4, wherein the first blade member further includes a first ride area on a side of the pivot joint opposite the first cutting edge of the first blade member, and wherein the second blade member further includes a second ride area on a side of the pivot joint opposite the second cutting of the second blade member, wherein when the first blade member is pivotally coupled to the second blade member by the pivot joint the first ride area and the second ride area arc on the same side of the pivot joint, and wherein the inclined orientation of the pivot joint maintained by the securing member prevents the first ride area from contacting with the second ride area such that the first ride area is spaced apart from and free of contact with the second ride area.

6. The scissors according to claim 5, wherein the securing member is adjustable to change the inclined orientation of the pivot joint to different inclinations relative to the first blade member to produce different moments which increase or decrease the tension and friction between the cutting edges.

7. The scissor according to claim 4, wherein the pivot joint hole is inclined at an angle relative to an axis perpendicular to the longitudinal axis of the first blade member and along the longitudinal axis of the first blade member to facilitate inclining the pivot joint in the inclined orientation.

8. A method of manufacturing scissors, comprising the steps of:

providing a pivot joint with a pivot axis and a diameter;

providing a securing member;

providing a first blade member having a first cutting edge and a longitudinal axis, and further providing the first blade member with a first pivot joint coupling portion having a pivot joint bore defined therein;

oversizing the pivot joint bore with respect to the diameter of the pivot joint in a direction along the longitudinal axis of are first blade member;

inserting the pivot joint in the pivot joint bore of the first pivot joint coupling portion of the first blade member;

coupling the securing member to the first blade member;

contacting a portion of the pivot joint with the securing member;

providing a second blade member having a second cutting edge and a second pivot joint coupling portion;

coupling the second pivot joint coupling portion of the second blade member to the pivot, joint such that the second pivot joint coupling portion of the second blade member is fixed relative to the pivot axis of the pivot joint;

pivotally coupling the second blade member to the first blade member through the pivot joint with the first cutting edge adjacent to the second cutting edge; and inclining, securing and maintaining the pivot joint in an inclined orientation within the pivot joint bore with the securing member, the inclined orientation of the pivot joint inclining the first blade member relative to the second blade member and the pivot joint in the direction of the longitudinal axis of the first blade member that the first pivot joint coupling portion of the first blade member is oblique to the pivot axis of the pivot joint;

wherein a moment is generated on the pivot axis or the pivot joint in a plane passing through the pivot axis and a point of contact between the first and second cutting edge, the moment forcing the first cutting edge is inclined into contact with the second cutting edge to produce tension and friction between the first and second cutting edges.

9. A method according to claim 8, further comprising the steps of:

further providing the first blade member with a first ride area on a side of the pivot joint opposite the first cutting edge of the first blade member, and further providing the second blade member with a second ride area on a side of the pivot joint opposite the second cutting edge of the second blade member, wherein when the first pivot joint coupling portion of the first blade member is pivotally coupled to the second pivot joint coupling portion of the second blade member by the pivot joint the first ride area and the second ride area are on the same side of the pivot joint;

wherein the first ride area is prevented from contacting with the second ride area when the inclined orientation of the pivot joint secured and maintained by the securing member inclines the first blade member relative to the second blade member and the pivot joint such that the first ride area is spaced apart from and free of contact with the second ride area.

10. A scissors, comprising:

a pivot joint having a pivot axis;

a first blade member having a first cutting edge, a first pivot joint coupling portion and a longitudinal axis;

a second blade member having a second cutting edge and a according pivot joint coupling portion, the second pivot joint coupling portion of the second blade member being coupled to the pivot joint such that the second pivot joint coupling portion of the second blade member is fixed relative to the pivot axis of the pivot joint, the second blade member also being pivotally coupled by the pivot joint to the first blade member with the first cutting edge adjacent to the second cutting edge, and the pivot joint being coupled to the first blade member through a pivot joint hole in the first blade member; and inclination means coupled to the first blade member and connected to a portion of the pivot joint for inclining and rigidly securing the pivot joint in an inclined orientation relative to the first blade member in a direction along the longitudinal axis of the first blade member such that the first pivot joint coupling being of the first blade member is oblique to the pivot axis of the pivot joint and the first blade member is inclined relative to the second blade member and the pivot joint, wherein inclining the first blade member relative to the pivot joint and the second blade member generates a moment on the pivot axis of the pivot joint in a plane passing through the pivot axis and a point of contact between the first and second cutting edges, the moment forcing the first cutting edge in contact with the second cutting edge to produce tension and friction between the first and second cutting edges.

11. The scissors according to claim 10, wherein the first blade member further includes a first ride area on a side of the pivot joint opposite the first cutting edge of the first blade member, and wherein the second blade member further includes a second ride area on a side of the pivot joint opposite the second cutting edge of the second blade member, wherein when the first pivot joint coupling portion of the first blade member is pivotally coupled to the second pivot joint coupling portion of the second blade member by the pivot joint the first ride area and the second ride area are on the same side of the pivot joint, and wherein the inclined orientation of the pivot joint that inclines the first blade member relative to the second blade member and pivot joint produced by the inclination means prevents the first ride area from contacting with the second ride area such that the first ride area is spaced apart from and free of contact with the second ride area.

12. The scissors according to claim 10, wherein the pivot joint hole is inclined at an angle relative to an axis perpendicular to the longitudinal axis of the first blade member and along the longitudinal axis of the first blade member to facilitate inclining the pivot joint in the inclined orientation.

* * * * *